UNITED STATES PATENT OFFICE.

GEORGE D. BURTON, OF BOSTON, MASSACHUSETTS, ASSIGNOR TO THE BURTON COMPANY, OF BOSTON, MASSACHUSETTS, A CORPORATION OF MASSACHUSETTS.

PROCESS OF SOFTENING AND STRENGTHENING DEGUMMED VEGETABLE FIBERS.

1,156,462.  Specification of Letters Patent.  Patented Oct. 12, 1915.

No Drawing.  Application filed July 5, 1913.  Serial No. 777,499.

*To all whom it may concern:*

Be it known that I, GEORGE D. BURTON, a citizen of the United States, and a resident of Boston, in the county of Suffolk and State of Massachusetts, have invented a new and useful Improvement in Processes of Softening and Strengthening Degummed Vegetable Fibers, of which the following is a specification.

When the resinous and jelly-like gummy binding substances, known generally as pectose and pectine, have been removed from such vegetable fibrous substances as flax, jute, hemp and ramie, the tensile strength of the fiber is reduced to from one-twentieth to one-fortieth of its original strength before the degumming operation, and the fiber is harsh and brittle. However, if the degummed fiber is treated with a saponified vegetable oil such as olive oil (castile soap) as set forth in my United States Letters Patent No. 870,157, dated November 5, 1907, the tensile breaking strength of the degummed fiber after such treatment is increased from ten to twenty-two fold and it is no longer harsh and brittle, but soft and suitable for spinning. I have discovered that such degummed fibers may be softened and strengthened and caused to again adhere or become bound together without using such saponified vegetable oil as aforesaid by treating them with a solution consisting preferably of about two parts of a triatomic or triacid alcohol, such as glycerin, and one part of an alkaline substance, such as sodium carbonate, although I do not limit myself to these proportions.

In carrying out my process the fiber is degummed in any suitable manner, such as that set forth in my Letters Patent referred to, in which sodium carbonate is mentioned as one of the several suitable softening agents that may be employed, and the fiber so degummed is then treated with a solution of a suitable triatomic alcohol, such as glycerin, and an alkaline substance, and finally subjected to roller pressure for the purposes set forth in said Letters Patent.

After the degumming process, the fiber may be washed with water and then removed to a suitable tank or vat and treated with the solution of glycerin, or other suitable triatomic alcohol, and an alkaline substance. It is not necessary, however, to remove it from the degumming tank when sodium carbonate or other suitable alkaline substance is used as a softening agent, for, as will be obvious, after the degumming operation, glycerin, or other suitable triatomic alcohol, may be added to the alkaline degumming solution for the purpose of forming the softening and strengthening solution. If sodium carbonate or other suitable alkaline substance is employed as a softening agent, the fiber may be removed from the degumming tank and, without washing it, placed in another tank containing glycerin, or other suitable triatomic alcohol, in which case the alkaline substance, with which the fiber is impregnated, will form, with the glycerin, or triatomic alcohol, a suitable softening and strengthening solution.

Whatever softening or degumming solution be used, it will be obvious that after the degumming operation, such solution may be drawn off and the softening and strengthening solution put into the tank. In such case, if sodium carbonate or other suitable alkaline substance be used as a softening agent and the fiber be washed with water after the degumming solution is drawn off, the solution of glycerin, or other triatomic alcohol, and an alkaline substance will be put into the tank; but if the fiber is not washed with water after degumming with said alkaline solution, then after the latter has been drawn off, glycerin or other suitable triatomic alcohol may be added to the tank, in which case the alkaline substance, with which the fiber is impregnated, will form, with such glycerin or other triatomic alcohol, a suitable softening and strengthening solution.

The tank in which the degumming operation is carried out, as well as the tank in which the degummed fiber is treated with the softening and strengthening solution, preferably are of such construction that the fiber is agitated during treatment.

The fiber may be subjected to roller pressure immediately after degumming and before treatment with the softening and strengthening solution, or it may be treated with the latter solution before it is subjected to roller pressure.

If desired, the fiber may be bleached with any suitable bleaching agent, such as an organic acid having an affinity for the vegetable fiber, for instance, oxalic acid or acetic acid, at any stage of the process.

Inasmuch as the gist of my invention is the softening and strengthening of the fiber after degumming, by means of the solution hereinbefore named, that is to say, feeding it with some substance for which it has an affinity to take the place of the natural gum which has been removed so as to prevent it from going to the spinning machinery in a "starved" condition, as it is called,—I do not wish to limit myself to the process set forth in my prior Letters Patent or any other process, inasmuch as the process defined by the appended claims is applicable for softening and strengthening degummed vegetable fibers, however prepared.

Glycerin, the formula of which is $C_3H_5(OH)_3$, is a triatomic or triacid alcohol and dissolves an alkaline substance, such as sodium carbonate, forming, as I believe, an alkaline alcoholate or an alkaline glycerid, specifically in the present case, possibly, a glyceryl salt, such as glyceryl carbonate, or perhaps, a complex combination of all three; but whether the product obtained by adding glycerin to a solution of an alkaline substance, such as sodium carbonate, is, strictly speaking, a chemical combination, and if so, whether stable or unstable, or merely a mechanical mixture, I regard as immaterial so far as the effect on the fiber is concerned; and therefore it will be understood that I use the term "solution" in the appended claims to cover a mechanical mixture as well as a chemical combination, however loose or unstable such combination may be, of glycerin and an alkaline substance.

In preparing the softening and strengthening solution, I prefer to add about two parts of glycerin or other suitable triatomic alcohol and one part of a suitable alkaline substance, such as sodium carbonate, to a sufficient quantity of hot water to dissolve the same; or I may add the alkaline substance to the triatomic alcohol and then add the hot water. It will be understood that I do not wish to limit myself to the exact proportions above set forth inasmuch as I have obtained good results by using other proportions, for example, substantially equal parts of each substance.

It will be further understood, of course, that I do not limit myself to sodium carbonate, inasmuch as other carbonates may be employed, or even to a carbonate, inasmuch as other alkaline salts of sodium and other metals may be employed; but Having fully described my invention, what I claim as new and desire to secure by Letters Patent is—

1. As an improvement in the art of softening and strengthening degummed vegetable fibers, the process herein described which consists in treating the degummed fiber with a solution consisting of glycerin and sodium carbonate.

2. As an improvement in the art of softening and strengthening degummed vegetable fibers, the process herein described which consists in treating the degummed fiber with a solution consisting of approximately two parts of glycerin and one part of sodium carbonate.

3. As an improvement in the art of softening and strengthening degummed vegetable fibers, the process herein described which consists in treating the degummed fiber with glycerin and sodium carbonate dissolved in hot water.

4. As an improvement in the art of softening and strengthening degummed vegetable fibers, the process herein described which consists in treating the degummed fiber with approximately two parts of glycerin and one part of sodium carbonate dissolved in hot water.

In testimony whereof, I have hereunto subscribed my name this 3rd day of July, 1913.

GEO. D. BURTON.

Witnesses:
E. B. TOMLINSON,
GEO. K. WOODWORTH.